United States Patent
Haase et al.

(10) Patent No.: US 7,610,328 B2
(45) Date of Patent: Oct. 27, 2009

(54) METHODS AND APPARATUS FOR A MULTI-TECHNOLOGY SUBSCRIBER BASE FOR GLOBAL ROAMING

(75) Inventors: Oliver Haase, Fair Haven, NJ (US); Kazutaka Murakami, Freehold, NJ (US); Ming Xiong, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 432 days.

(21) Appl. No.: 10/349,672

(22) Filed: Jan. 23, 2003

(65) Prior Publication Data

US 2003/0157938 A1    Aug. 21, 2003

Related U.S. Application Data

(60) Provisional application No. 60/351,299, filed on Jan. 23, 2002.

(51) Int. Cl.
*G06F 15/16*    (2006.01)
(52) U.S. Cl. .................. 709/201; 709/202; 709/203; 455/445
(58) Field of Classification Search ......... 709/201–203; 455/445
See application file for complete search history.

(56) References Cited

U.S. PATENT DOCUMENTS

| | | | | |
|---|---|---|---|---|
| 5,742,905 A | * | 4/1998 | Pepe et al. ................. | 455/461 |
| 5,930,700 A | * | 7/1999 | Pepper et al. ............. | 455/435.3 |
| 6,125,176 A | * | 9/2000 | Foladare et al. ......... | 379/211.02 |
| 6,141,556 A | * | 10/2000 | Dougherty et al. .......... | 455/445 |
| 6,707,901 B1 | * | 3/2004 | Hodges et al. ......... | 379/221.09 |
| 6,934,534 B1 | * | 8/2005 | Roy ........................ | 455/414.1 |
| 6,952,181 B2 | * | 10/2005 | Karr et al. .................... | 342/457 |
| 7,035,390 B2 | * | 4/2006 | Elliott .................... | 379/201.02 |
| 2002/0147845 A1 | * | 10/2002 | Sanchez-Herrero et al. . | 709/245 |
| 2002/0167906 A1 | * | 11/2002 | La Porta et al. ............. | 370/252 |
| 2004/0162068 A1 | * | 8/2004 | Lamb et al. .............. | 455/432.1 |
| 2004/0228336 A1 | * | 11/2004 | Kung et al. ................. | 370/352 |
| 2006/0070003 A1 | * | 3/2006 | Thompson et al. .......... | 715/758 |

* cited by examiner

*Primary Examiner*—Nathan J Flynn
*Assistant Examiner*—Mohamed Wasel
(74) *Attorney, Agent, or Firm*—Wall & Tong, LLP; Matthew J. Hodulik; Kenneth M. Brown

(57) ABSTRACT

A method and a system for providing a connection to a subscriber having multiple subscriber devices utilizing different communications protocols are disclosed. The subscriber is associated with an address to which incoming calls are addressed. The method and system provide for completing an incoming call to the subscriber address via one of the subscriber devices, where the device is selected from the subscriber devices based on a subscriber profile. The profile generally includes respective service profiles for each of the communications protocols utilized to establish the call, respective service profiles for each of the subscriber devices, and a user destination selection policy describing routing parameters that determine routing of the call to one or more of the subscriber devices.

19 Claims, 3 Drawing Sheets

METHODS AND APPARATUS FOR A MULTI-TECHNOLOGY SUBSCRIBER BASE FOR GLOBAL ROAMING

RELATED APPLICATIONS

The present application claims priority from Provisional Patent Application Ser. No. 60/351,299, filed on Jan. 23, 2002.

FIELD OF THE INVENTION

The present invention relates generally to communications networks and more particularly to global roaming in wireless networks.

BACKGROUND OF THE INVENTION

User mobility enables users to switch between end devices and still get the same, personal services. These services include the access to one's personal data, the availability of a personal collection of customized services, and the transparent reachability at the same user address. Personal addressing requires an infrastructure that (a) intercepts calls to (static) user addresses and (b) dynamically maps a user address to one or several devices addresses. The possible degree of flexibility and intelligence of this mapping depends to a large extent on the infrastructure's knowledge of the potential terminating end devices. In case of fixed wire phones, to know whether the phone is currently on-hook or off-hook helps, e.g., to not route the call to a busy phone but to another device. In case of mobile phones, the range of potentially available status and configuration information is much broader. It can include registration and location information, the actual availability status, and the phone's value added service settings such as call forwarding activation, barring of incoming calls, do not disturb, etc. The more information the infrastructure can draw on, the more intelligent the destination selection process can be. A system that can take advantage of all the above information—and thus integrates terminal and user mobility—is called a global roaming infrastructure.

Such an infrastructure requires a notion of a user who can own multiple (fixed wired and wireless) devices, and it needs to model and manage an appropriate subscriber base. Even if this subscriber base is realized as a federated database comprising separate, traditional subscriber bases, such as the Home Location Registers (HLR) in cellular networks, it requires a unifying subscriber data view as well as the storage of novel, global roaming supporting entities. The implementation of a multi-technology subscriber base as one integrated database, is beneficial with respect to storage efficiency as well as data plausibility. Of course, integration does not equal centralization and, in fact, one implementation of the present invention is highly distributed over multiple network elements. What is needed is an appropriate model for a global roaming subscriber base.

SUMMARY OF THE INVENTION

Global Roaming, i.e., the combination of terminal and user mobility, requires the technology independent notion of a user who owns multiple devices. Any network infrastructure that supports global roaming needs to model and manage this user concept in a multi-technology subscriber database. This modeling not only requires the novel assignment of traditional subscriber attributes to the now separated entities of users, terminals, and addresses. For backward compatibility reasons, it also has to be compliant with the standard, single-technology subscriber models. Moreover, user configured inter-technology dependencies between service settings need to be taken into account to (1) enforce external integrity constraints, and (2) reduce space consumption of the multi-protocol subscriber base.

The present invention a methodology for connecting to a subscriber having multiple devices accessible via a communications network and utilizing differing communications protocols. The methodology includes the steps of assigning at least one address to said subscriber; assigning at least one first type service profile per communication protocol used to set up a call request to said subscriber and assigning one second type service profile per each one of said devices. A destination selection policy is provided for describing routing parameters of an incoming call to the subscriber. A destination selection policy and the first and second type profile are referenced in order to make a connection to an appropriate one of said multiple devices using an appropriate one of said communications protocols. A user profile is disclosed which is a collection of at least one terminal profile and at least one incoming call handling (ICH) service profile, the ICH service profile includes the at least one first and second type profile.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
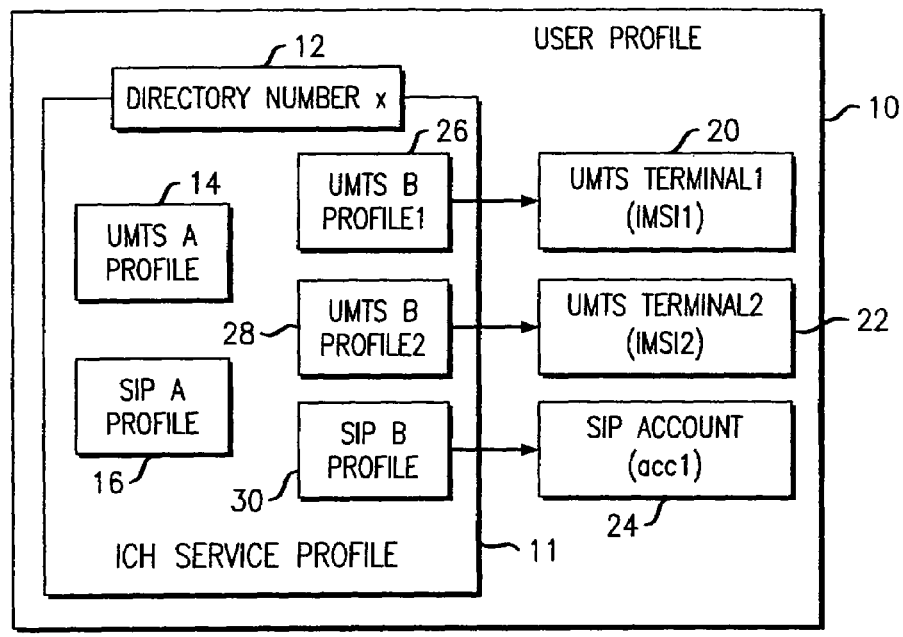
FIG. 1 is an exemplary embodiment of an ICH service profile.

The present invention discloses a methodology for providing a multi-technology subscriber database to achieve global roaming. Although an exemplary embodiment of the invention is described in connection with the UMTS wireless protocol, it would be understood that the present invention may also be adaptable to other protocols, for example, ANSI41 and SIP Internet telephony.

In order to arrive at an appropriate model for a global roaming subscriber base, today's subscriber data, such as basic and value-added service settings needs to be newly classified. This is because the formerly collapsed entities user, device, and address now become separate entities that may relate to each other, and the various subscriber data need to be assigned to one or a combination of these entities.

One important criterion for a new extended subscriber model is standard compliance. That is, even though formerly flat subscriber data gets scattered over multiple logical entities, and even though the subscriber data model of the present invention is meant to provide added flexibility, standard operations are still to be supported. Thus, the data model has to be standard compliant for all involved technologies. As will be shown, the present invention data model provides full backward compatibility by complying with existing standards.

A multi-protocol subscriber base according to the invention will also help to harmonize services across protocol boundaries. For instance, users can specify address level call forwarding numbers that are independent of both the originating technology and the actually alerted end devices. By so doing, the database can not only save storage space by avoiding data replication, but it can also ensure the integrity of this inter-protocol constraint.

Multi-Protocol User Concept

In cellular networks, the term "subscriber" in fact means terminal—or "SIM card" to be more precise. (In fact, the addressed entity in a cellular network is the SIM card rather than the cell phone. However, as in reality SIM cards are hardly ever moved from one cell phone to another, one can consider the cell phone the addressable entity.) That is, the central concept in terms of addressable entity and service data assignment is the terminal. Consequently, in order to call a person, one has to know the address of a terminal the person is using and call this terminal. This "mapping on the human level" has a number of shortcomings: First, users change their terminals over time (that is particularly true for cell phones), which requires the distribution of new addresses. Second, even within a short period of time, say a day, users might want to be reached at different terminals, e.g. their office phone during business hours, their cell phone while commuting, and their voice mail in the evenings. This callee determined selection of terminating terminal is not trivially accomplished with the current approach of terminal addressing.

SIP, the predominant signaling protocol for Internet telephony (and standard technology for 3rd generation wireless telephony), provides a great deal of flexibility through the introduction of user addresses (SIP URLs) that are dynamically mapped to one or several actually registered SIP end points. However, this user mobility concept is technology dependent, meaning that (a) callers need to use SIP to place user level calls, and (b) callees need to perform SIP registrations to make this approach work.

The approach of the present invention aims at providing inter-protocol user mobility where callers can use any originating technology to place calls to user addresses, and callees can use any technologies/terminals to have the calls terminated. This requires a multi-protocol concept of users who can have multiple terminals belonging to different network technologies each of which can terminate incoming calls to user level addresses.

Classification of Subscriber Data

In a cellular network such as UMTS, devices can have multiple addresses. However, each address is associated with exactly one device. Some service data are assigned to addresses, i.e. the actual service setting depends on what address is used to call the device. The call forwarding number, e.g., is a service setting that depends not only on the devices to be reached, but also on the dialed number. Some services, on the other hand, only depend on the addressed device, not on the actually dialed address.

In a user mobility supporting system, the many-to-one mapping from addresses to terminal becomes a many-to-many mapping, as an address can now be associated with multiple terminals. This extended flexibility results in three categories of service assignments:

1. Services that are associated with a terminal. These services are the same independent of what address has been used to reach the terminal. Examples are: current location or roaming restrictions.
2. Services that are associated with an address. These services are independent of the actual terminating terminal (s). The most prominent examples are call forwarding related service settings. This is because call forwarding takes place exactly when the call cannot be completed with any of the terminals denoted by the respective address. So it seems natural to assign these settings to the address level.
3. Services that are associated with the relationship between an address and a terminal. These services depend on both the called address and the terminating terminal. One example is barring of incoming calls while roaming. This service is definitely terminal related as the terminal is the roaming entity. In addition, it should also be address related in order to, e.g., be able to bar expensive incoming calls for everyone but family members.

However, it should be noted that in many cases the categorization of service data is a design decision.

Multi-Technology User Profiles

A user might want to define several user addresses, each of which is associated with its own set of service configurations (for, e.g., call forwarding, barring of incoming calls, do not disturb, etc.). To support this, we introduce the concept of a User Profile that consists of multiple terminal profiles as well as multiple Incoming Call Handling (ICH) Service Profiles. Each ICH Service Profile is separately addressable.

An ICH service profile consists of the following components:
  At least one address, i.e. phone number or SIP URL. Strictly speaking, one phone number is sufficient to call the ICH service profile from both a circuit-switched and an Internet device. However, as a SIP URL is typically much easier to memorize and thus users can assign multiple addresses to ICH service profiles if desired.
  A destination selection policy. This set of rules determines how an incoming call to the user address is routed to one or more physical terminals at call set-up request time. These rules can be based on time-of-the-day, caller id, currently available networks, current location, etc.
  A set of A-Profiles. For every network protocol that the service profile has an occurrence in, the ICH service profile needs a so-called A-Profile. If, e.g., the ICH profile has a UMTS phone number associated, it will need a UMTS A-Profile. If it has a SIP URL associated, it will have a SIP A-Profile. However, as for SIP originated calls phone numbers can be used too, an ICH service profile can have a SIP A-Profile even if it does not have a SIP URL. Only in this case, it will be reachable from SIP. The A-Profiles contain service data that is classified as address related in the previous section.
  A set of B-Profiles. For every terminal that is referred to, the ICH profile will have a corresponding B-Profile. The B-Profiles contain the service data that was classified as address and terminal related in the previous section.

Service data on the terminal level is not part of the ICH service profiles themselves. The ICH profiles rather point to the terminal profiles they can map an incoming call to, and the terminal level data is stored in the terminal profiles. Terminal level data are the subscriber data that are associated with a terminal, but have no relationship with a callable address.

An example user profile 10 is shown in FIG. 1. As shown, the depicted user profile 10 includes a specific ICH profile 11 which is associated with a phone number x (12) that happens to be a UMTS number. This is why the ICH profile contains a UMTS A-Profile 14. It also has a SIP A-Profile 16, thus being reachable from a SIP network. The ICH profile points to three terminals/accounts, i.e., two UMTS terminals 20, 22 and one SIP account 24. It contains a B-Profile 26, 28, 30 for each of these three entities.

Figure 2:
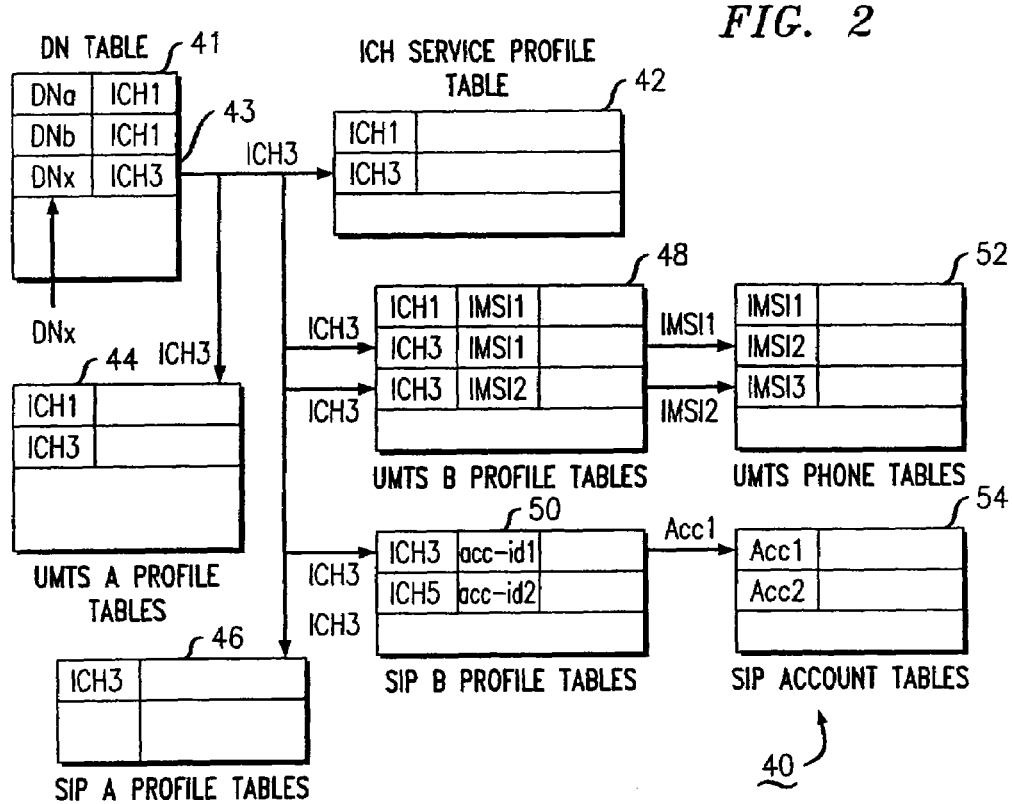
FIG. 2 is an exemplary representation of a high level table layout.

FIG. 2. shows a high level relational table layout 40 for ICH service profile and terminal/account related data. An entry point to these tables is the DN Table 41 that contains the mapping from phone numbers to ICH service profile IDs. In the figure, we assume the directory number x from FIG. 1 is mapped to ICH profile ID ICH3 (43). A similar table exists for the mapping from SIP URLs to ICH service profiles; however, for the sake of simplicity this table is not shown in FIG. 2.

With the ICH profile ID, the corresponding entries in the ICH Service Profile Table 42, the A-Profile Tables 44, 46, and the B-Profile tables 48, 50 can be found. Note that the ICH profile ID is a unique key for each of the A-Profile Tables, whereas it is not unique for the B-Profile tables. This is because an ICH service profile can, e.g., have zero or one UMTS A-Profile, but it can refer to multiple UMTS terminals at the same time (see FIG. 1). The UMTS Phone Table 52 and the SIP Account Table 54 provide more detailed information to the respective B-Profile tables. Finally, every B-Profile entry points to its respective terminal by means of a foreign key (IMSI in case of UMTS, an internal account ID in case of SIP).

UMTS Standard Compliance

To be compliant with the UMTS standard(s), it is necessary to retrieve related subscriber information from an UMM (Universal Mobility manager) database with a given International Mobile Subscriber Identity (IMSI) or directory number, which is a Mobile Station ISDN Number (MSISDN) in UMTS. In the UMTS standard, an IMSI uniquely identifies an UMTS terminal, and an MSISDN is always associated with a terminal. On the other hand, a UMTS terminal can have only one IMSI, but it may have multiple MSISDNs. A Unified Mobility Manager (UMM), a location management component that unifies Home Location Register (HLR) functionality for multiple cellular networks and SIP proxy functionality for Internet telephony networks has been described in related patent application Ser. No. 09/813,016, entitled Multi-Protocol Home Location Register and Method of Use (LaPorta 50-8-56-4), the subject matter which is incorporated by reference herein.

getSubscriberDataByIMSI

UMTS standard compliance requires that for a given IMSI, getSubscriberDataByIMSI returns a compliant set of UMTS subscriber data, which belongs to the terminal that is identified by the IMSI. To do so, all UMTS related tables must be queried to collect the scattered subscriber information from different tables. However, a terminal may belong to multiple ICH service profiles in the UMM. For a given terminal with its IMSI, it needs to be determined which ICH service profile needs to be used to retrieve necessary subscriber information so that it is compliant with UMTS standard.

Figure 3:
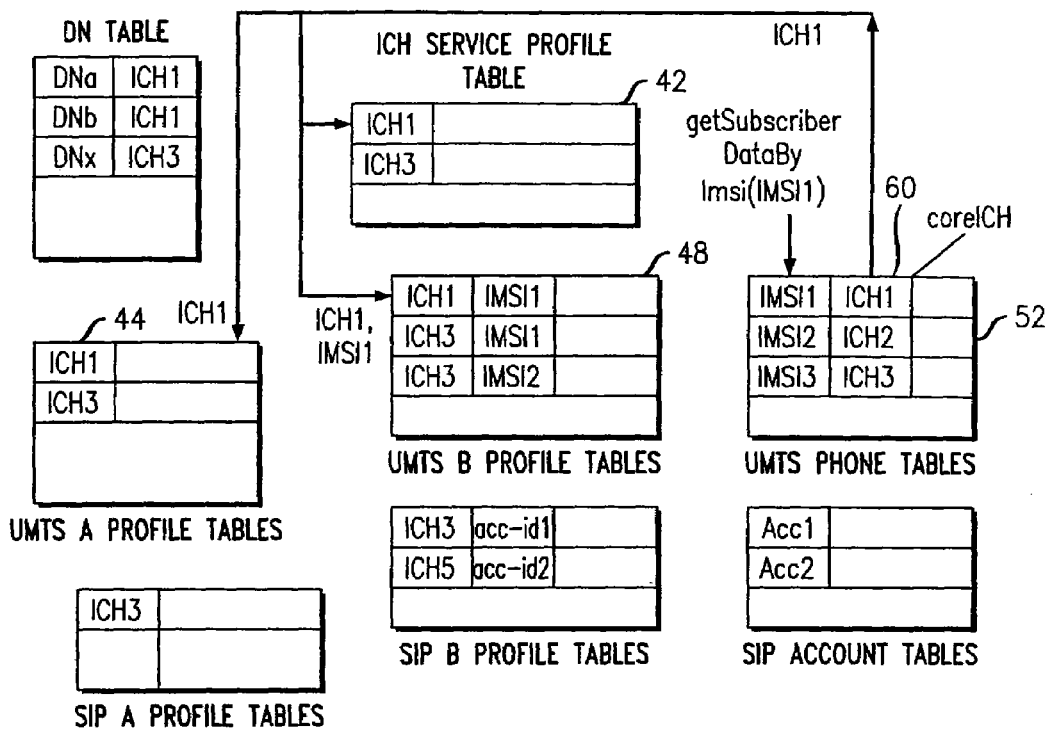
FIG. 3 is an exemplary traversal of UMTS data for a given IMSI with relation to the high level table layout.

To solve this problem, it is necessary to assign one dedicated ICH service profile, referred to as Core ICH Service Profile (CICH SP), to each UMTS terminal (potentially each IMSI). The UMTS data of this CICH SP together with the terminal level UMTS data is used to assemble one standard compliant subscriber data set. FIG. 3 shows the traversal of all UMTS related tables for a given IMSI. For a given IMSI, the entry point is the terminal level UMTS Phone tables 52, where amongst other data, the ID of the CICH service pro-file—in this case ICH1 60—is stored. Using ICH1, the appropriate entries in the ICH Service Profile table 42 and the UMTS A Profile Tables 44 can be found. With the combination of ICH1 and IMSI1, the correct entry in the UMTS B Profile table 48 can be found.

getSubscriberDataByMSISDN

Figure 4:
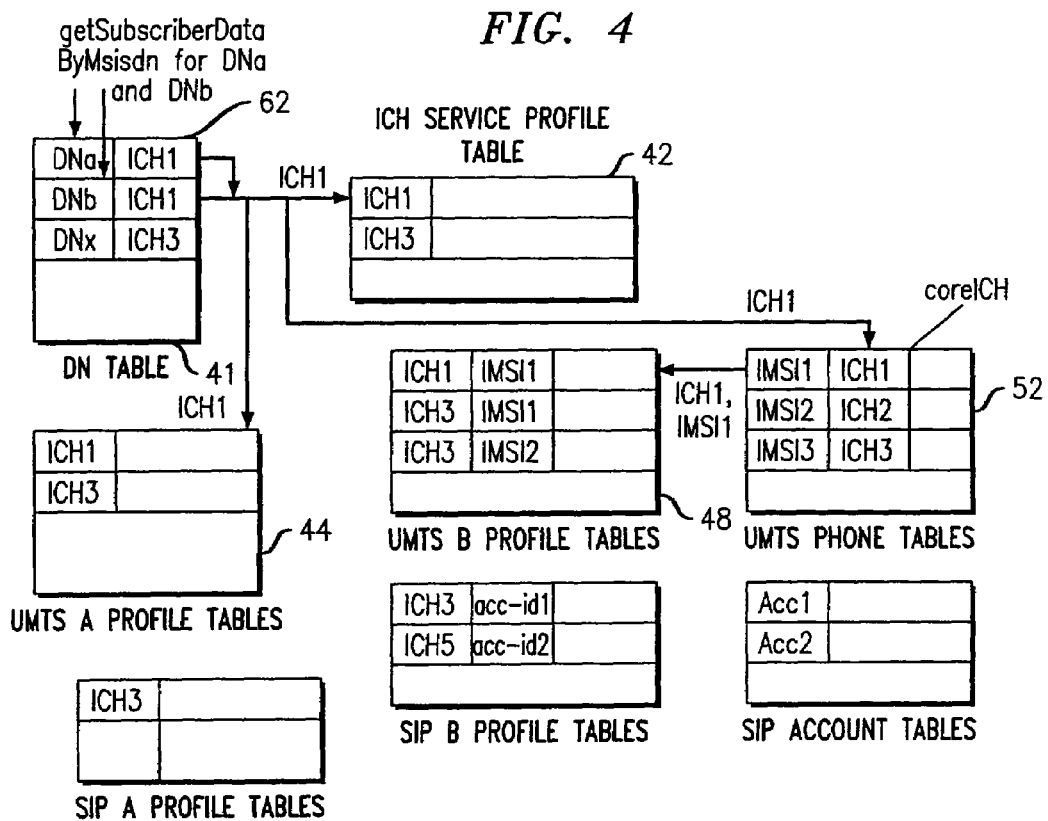
FIG. 4 illustrates an exemplary traversal of UMTS data for a given MSISDN with relation to the high level table layout.

On the other hand, all MSISDNs belonging to a UMTS terminal should be used to retrieve the standard compliant subscriber data of the terminal. For these MSISDNs, getSubscriberDataByMSISDN will return the same set of UMTS compliant subscriber data as getSubscriberDataByIMSI does for the terminal's IMSI. Such MSISDNs have to be in a core ICH service profile so that they can be used to retrieve UMTS standard compliant subscriber data. Other MSISDNs that are not associated with a core ICH service profile in SDHLR are not considered to represent particular UMTS terminals. These MSISDNs cannot be used for getSubscriberDataByMSISDN because there are no UMTS standard compliant subscriber data associated with them. FIG. 4 shows the traversal of all UMTS related tables for a given (valid) MSISDN belonging to an UMTS terminal. The given MSISDN is used to get the corresponding ICH service profile ID from the DN Table 41, in this case ICH1. Using ICH1, the appropriate entries in the ICH Service Profile table 42 and the UMTS A Profile Tables 44 can be found. Also using ICH1, we can select the entry in the UMTS Phone tables 52 that has ICH1 is its CICH service profile. Finally, this phone's IMSI together with ICH1 can be used to select the correct entry in the UMTS B Profile table 48.

Core vs. Extended ICH Service Profiles

A Core ICH Service Profile is used for standard compliance of different technologies, such as UMTS, ANSI41, and SIP. For different technologies, a core ICH service profile must be used to retrieve standard compliant subscriber information for a terminal, or directory number (SIP ULR if the technology is SIP) belonging to the core ICH service profile. Since a core ICH service profile is dedicated to a terminal of a technology, there must be restrictions for such dedications in order to meet standard compliance.

Definition 1: A Core ICH Service Profile (CICH SP) for a technology X (UMTS/ANSI/SIP) terminal has to satisfy the following restrictions:
   The CICH SP can only be the core profile to at most one terminal of the same technology. This terminal is named core terminal of this technology for the CICH SP.
   The CICH SP must have an A-Profile of technology X, and it can have at most one A-Profile per technology.
   The CICH SP must have only one B-Profile for the core terminal of technology X.
   The CICH SP cannot have a B-Profile for a terminal that is not a core terminal to this CICH SP.
   The "core" relationship between a terminal of technology X and a CICH SP is symmetric. That is, if a CICH SP is the core profile to a terminal, then the terminal must be the core terminal of technology X to the CICH SP, and vice versa. A CICH SP can have core terminals from different technologies, but at most one core terminal per technology. However, a CICH SP may not have a core terminal from each technology. But a CICH SP is allowed to have an A-Profile for a technology that it does not have a core terminal associated with.

It should be noted that a dual mode terminal that supports two technologies, e.g., UMTS and ANSI41, is logically treated as two terminals, i.e., one UMTS and one ANSI41 terminal. An ICH service profile that is not the core profile to any terminal is called an Extended ICH Service Profile.

Common Attributes

In order to receive a service from multiple types of networks, the user profile must accommodate service profile information specific to each of these network protocols. There are, however, some standard types of services across many protocols, such as call forwarding, call barring, call waiting and so on. Common attributes can be defined for such services, such as call barring activation state attribute and call forwarding number attribute. Having an attribute be common means to enforce the same configuration for all protocols that use this kind of attribute.

Defining common attributes has the following advantages:
  A user can have the same service across terminals, promoting our user mobility concept. For example, we can use the same call forwarding number regardless of the addressed network. Call waiting can be active in the UMTS phone as well as in the ANSI phone.
  When a user uses a multi-mode terminal, such as dual mode phone for GSM and ANSI networks, he can receive the same service independent of what network he is roaming to. Furthermore, some data must be common across protocols for a multi-mode terminal since the terminal must reside only in a single network at a time. Current location and activation state of a terminal are such examples. These values can be enforced to exist only once by utilizing common attribute.
  Some of attribute values in the extended ICH service profile can be enforced to be the same as those of the core ICH service profile by using common attribute concept. This type of enforcement is appropriate for a service provider where having a different service value in the extended ICH does not make sense. For example, a UMTS service provider who does not introduce optimal routing premises, call forwarding no answer is always handled by the value stored in the core ICH service profile, regardless of the value in the extended ICH.
  When a user wants to upgrade from one type of network to another, e.g., from GSM to UMTS release 5 all-IP wireless networks, a user can keep the old service setting for the common standard services in the common service tables.

Common attributes can be defined in A-Profile, B-Profile, and terminal level profile, which we call common A, common B and common phone tables, respectively. We can introduce a flag indicating whether the value should be common or not. There are two approaches to solve this issue. One approach is to introduce a flag per attribute indicating if the values are common or not. If so, the value in common profile table is used, otherwise, the entry in the corresponding A, B or phone profile table is used. With this approach, we can specify the commonality condition per attribute. The usage of one single entry for a common attribute ensures the consistency of the data. However, as for every attribute either the storage space in the common table or in the protocol specific tables is used, the not used storage space is wasted, leading to increased storage requirements.

Figure 5:
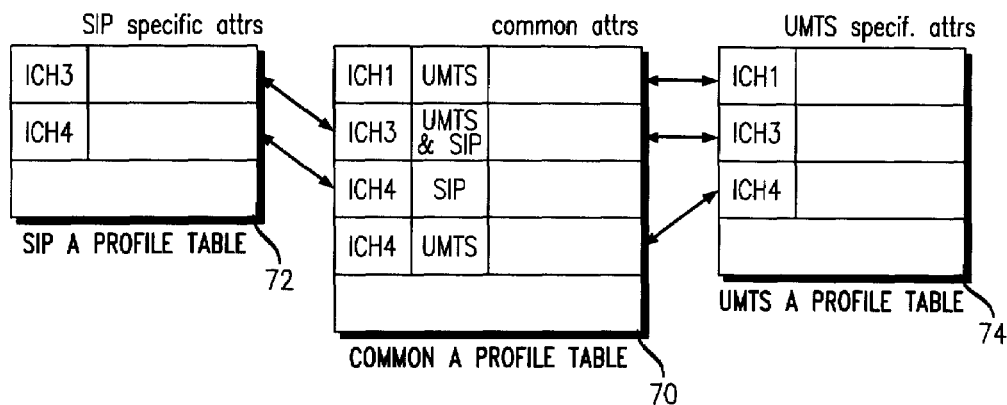
FIG. 5 illustrates sharing of common A-Profile information across protocols.

Referring to FIG. 5, an alternative option is to specify if all attributes in a common table are the same for all related protocols or not. If they are all same, we can save the storage space by requiring only one record for such a user in common table only. With this approach, they could be all different by introducing one record per protocol. FIG. 5 illustrates this second option by using the common A-Profile Table 70 as an example, which includes data from a SIP A Profile Table 72 and a UMTS A Profile Table. 74. This option provides the same benefit in terms of data consistency as the previous one, and additionally reduces storage consumption. However, it comes at the price of a coarser granularity of commonality.

In order to enforce that the values of an extended ICH to be equal to those of the corresponding core ICH, we can introduce a flag in extended ICH indicating if the value in core ICH should be used or not. This only happens in common A and common B-Profiles. If the flag is set, then the attribute entry in the respective common profile in the extended ICH is not used.

Many A-Profile attributes are the same in terms of format for all protocols, most prominently call forwarding related service data, such as call forwarding unconditional and call forwarding no answer. They are naturally defined per user address. For example, we may want to define a different call forwarding number to the address for the family than that for the coworkers.

Common B-Profile could have incoming call barring information. This feature typically blocks incoming call unconditionally or depending on the current location. The call could be barred if the user is out of home roaming area. We could have the same setting for all terminating protocols inside the ICH service profile. Or we could enforce extended ICH to have the same B value setting as the corresponding core ICH service profile, so that we can define the same call barring definition per terminal.

Finally, examples of common phone profile attributes include call waiting service information, call transfer service data, and current location information. Each device has one record in this table, and a flag is used if the service is common for multiple protocols for a multi-mode phone. Some of the data, however, must be enforced to be equal across protocols as discussed before. No commonality selection flag is defined for such an entry.

Exemplary Processing Flow

After having discussed the present invention multi-protocol subscriber base approach, it is now illustrated how the invention can be used to realize an infrastructure for the support of Global Roaming.

As discussed previously, the Unified Mobility Manager (UMM)} is a location management component that unifies Home Location Register (HLR) functionality for multiple cellular networks and SIP proxy functionality for Internet telephony networks. This enables us to route a call to a user address to one or multiple of the user's terminals, taking into consideration the user's Destination Selection Policy, their currently used networks, location, and service settings. Internally, the UMM uses the multi-protocol subscriber base for the storage and retrieval of service and location data.

A closer look is taken at exactly what happens at call set-up time. For this scenario, the use of ICH service profile from FIG. 1 is assumed, and it is further assumed that the user has powered on UMTS terminal 1, and registered one or more SIP end points for SIP account acc1.

Figure 6:
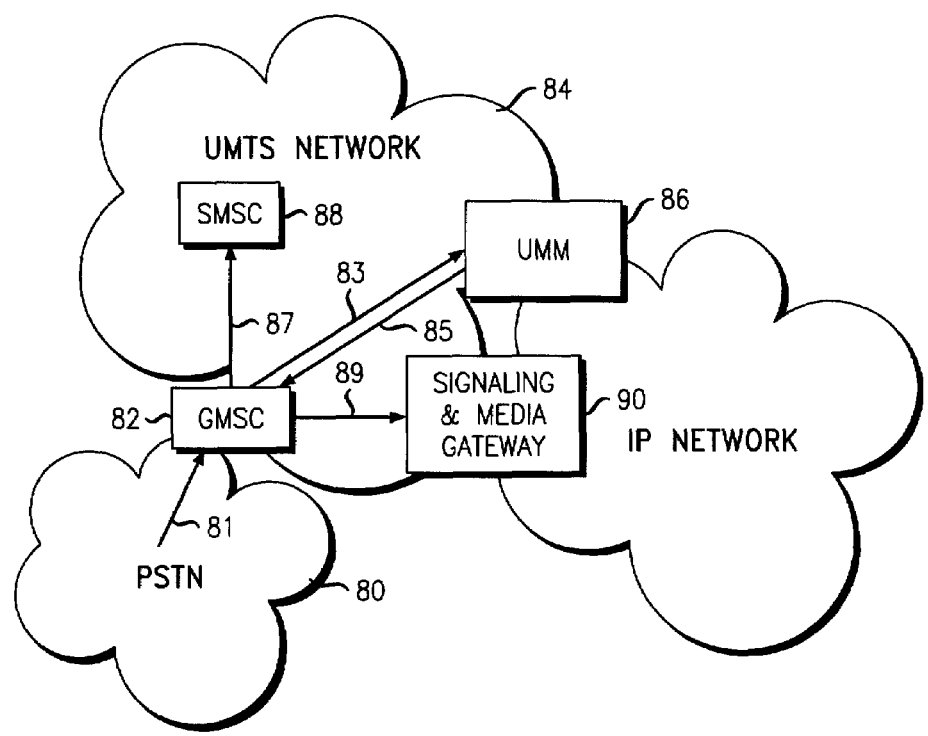
FIG. 6 shows an illustration of an exemplary network implementing the present invention.

Referring to FIG. 6, assume a caller in a circuit-switched network 80 dials phone number x which as mentioned is a mobile UMTS number. Due to the UMTS specific number prefix, the call request will be routed to a UMTS Gateway Mobile Switching Center (GMSC) 82 (and arrow 81). This is the ingress element of a UMTS network 84. The GMSC 82 will send a Provide Routing Number request 83 to the networks central HLR, in our case the UMM 86 acting as an HLR.

Internally, the UMM will send a Get Subscriber Data for Request Location request to the multi-protocol subscriber base. This has the subscriber base collect and return:
- the Destination Selection Policy of the ICH service profile denoted by phone number x;
- the same ICH service profile's UMTS A-Profile as the call originated from a UMTS network;
- B-Profile and terminal/account level data for all terminals/accounts that are referred to from this ICH profile.

For each potential candidate, the combination of B-Profile and terminal data is used to check whether the terminal can be used to complete the call. This is done by checking the terminal's availability and service settings such as barring-of-incoming calls.

The remainder of this set (if still greater than one entry) is fed into a rules engine that uses it together with the DSP and the current context (such as time-of-the-day, caller id, etc.) to compute an ordered list of terminals to be alerted.

In the example, assume the destination selection process determines that UMTS terminal 1 is to be alerted first, and in case it does not answer the call, SIP account acc1 next. Now, the UMM 84 needs to do two things: (1) It needs to request a temporary routing number trn from the current Serving Mobile Switching Center (SMSC) 88 of UMTS terminal 1; and (2) In order to enable the requesting UMTS GMSC 82 to route the call to the SIP account, it needs to select an appropriate signaling and media gateway 90, denoted by phone number gw.

Finally, the UMM returns the downloaded A-Profile information together with the routing number trn and the gateway number gw to the UMTS GMSC (arrow 85). Note that all this data is UMTS protocol data. The GMSC uses this information to route the call first to trn (arrow 87) and then, in case of non-completion, to gw (arrow 89). This way, the call to a user address has been routed to some of the user's terminals.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The software, defining functions of the embodiments (including the methods described herein) can be contained on a variety of computer-readable storage media. Illustrative computer-readable storage media include, but are not limited to: non-writable storage media (e.g., read-only memory devices within a computer such as CD-ROM disks readable by a CD-ROM drive) on which information is permanently stored writable storage media (e.g., floppy disks within a diskette drive or hard-disk drive) on which alterable information is stored; and so on. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method for providing a connection to a subscriber, said method comprising:
    assigning an address to said subscriber, wherein said subscriber is associated with multiple devices accessible via a communications network and utilizing differing communications protocols;
    assigning at least one first type service profile per communication protocol used to set up a call request to said subscriber by said address, wherein said at least one first type service profile includes service related data classified as address related;
    assigning at least one second type service profile per each one of said multiple devices, wherein said at least one second type service profile includes service related data classified as both address and terminal related;
    assigning a core incoming call handling service profile to at least one of said multiple devices, said core incoming call handling service profile having one core terminal per technology and being utilized for standard compliant connection queries regarding said subscriber;
    providing a destination selection policy for describing routing parameters of an incoming call to said subscriber; and
    analyzing, in response to said call request, said destination selection policy, said at least one first type service profile, and said at least one second type service profile to make a connection to an appropriate device of said multiple devices using an appropriate one of said communications protocols,
    wherein said communications protocols comprise at least one of UMTS, ANSI, SIP or combinations thereof.

2. The method of claim 1, wherein a user profile comprises:
    at least one terminal profile; and
    at least one incoming call handling (ICH) service profile, wherein said ICH service profile includes said at least one first type profile and said at least one second type profile.

3. The method of claim 2, wherein said at least one terminal profile comprises: terminal level and address independent service information, including location information.

4. The method of claim 2, wherein said at least one terminal profile is dynamically updated.

5. The method of claim 1, wherein said analyzing comprises:
    checking availability of a device of said multiple devices; and
    checking barring of incoming call service settings for said device.

6. The method of claim 1, wherein said routing parameters of said destination selection policy are based on information selected from the group consisting of: time-of-day, caller identification, currently available network, and current location.

7. The method of claim 5, further comprising:
upon determining that more than one device of said multiple devices is available, computing an ordered list of devices to be alerted.

8. The method of claim 6, further comprising:
upon determining that an originating communications protocol differs from a terminating communications protocol for said call request, selecting an appropriate gateway for completing said call request.

9. A computer-readable storage medium containing instructions for controlling a computer system to perform a method for providing a connection to a subscriber, said method comprising:
assigning an address to said subscriber, wherein said subscriber is associated with multiple devices accessible via a communications network and utilizing differing communications protocols;
assigning at least one first type service profile per communication protocol used to set up a call request to said subscriber by said address, wherein said at least one first type service profile includes service related data classified as address related;
assigning at least one second type service profile per each one of said multiple devices, wherein said at least one second type service profile includes service related data classified as both address and terminal related;
assigning a core incoming call handling service profile, said core incoming call handling service profile having one core terminal per technology and being utilized for standard compliant connection queries regarding said subscriber;
assigning a destination selection policy for describing routing parameters of an incoming call to said subscriber; and
wherein said destination selection policy, said at least one first type service profile, and said at least one second type service profile are considered, in response to said call request, to make a connection to an appropriate device of said multiple devices using an appropriate one of said communications protocols, and wherein said communications protocols comprise at least one of UMTS, ANSI, SIP or combinations thereof.

10. The computer-readable storage medium of claim 9, wherein user profile comprises:
at least one terminal profile; and
at least one incoming call handling (ICH) service profile, wherein said ICH service profile includes said at least one first type profile and said at least one second type profile.

11. The computer-readable storage medium of claim 10, wherein said at least one terminal profile comprises: terminal level and address independent service information, including location information.

12. The computer-readable storage medium of claim 10, wherein said at least one terminal profile is dynamically updated.

13. The computer-readable storage medium of claim 9, wherein said routing parameters of said destination selection policy are based on information selected from the group consisting of: time-of-day, caller identification, currently available network, and current location.

14. The computer-readable storage medium of claim 9, wherein said method further comprises: checking availability of a device of said multiple devices; and checking barring of incoming call service settings for said device.

15. The computer-readable storage medium of claim 14, wherein said method further comprises: upon determining that more than one device of said multiple devices is available, computing an ordered list of devices to be alerted.

16. The computer-readable storage medium of claim 14, wherein said method further comprises: upon determining that an originating communications protocol differs from a terminating communications protocol for said call request, selecting an appropriate gateway for completing said call request.

17. A method for handling an incoming call to a subscriber, the method comprising:
receiving a request for establishing said incoming call to said subscriber addressed to an address associated with said subscriber, wherein said subscriber is associated with multiple devices utilizing one or more different communications protocols; and
analyzing a user profile of said subscriber to determine one or more appropriate devices of said multiple devices for completing said incoming call, wherein said user profile comprises:
one or more incoming call handling (ICH) service profiles, wherein one of said one or more ICH service profiles is associated with said address, each of said one or more ICH service profiles comprising:
a first type service profile per each communications protocol used to set up a call request to said subscriber, said first type service profile including address related data;
a second type service profile per each of said multiple devices, wherein said second type service profile includes address and terminal related data; and
a user destination selection policy describing routing parameters determining routing of an incoming call to one or more of said multiple devices.

18. The method of claim 17, wherein said one or more ICH service profiles comprise a second ICH service profile associated with a second address, wherein said second address is different from said address and wherein said second address is associated with said subscriber.

19. The method of claim 17, wherein said address is one of a phone number and SIP URL.

* * * * *

UNITED STATES PATENT AND TRADEMARK OFFICE
CERTIFICATE OF CORRECTION

PATENT NO. : 7,610,328 B2  Page 1 of 1
APPLICATION NO. : 10/349672
DATED : October 27, 2009
INVENTOR(S) : Haase et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Twelfth Day of October, 2010

David J. Kappos
*Director of the United States Patent and Trademark Office*